United States Patent [19]

Tchitdjian

[11] Patent Number: 4,605,038

[45] Date of Patent: Aug. 12, 1986

[54] FLOAT VALVE CONTROL

[75] Inventor: John K. Tchitdjian, Downsview, Canada

[73] Assignee: Garland Commercial Ranges Limited, Mississauga, Canada

[21] Appl. No.: 728,332

[22] Filed: Apr. 29, 1985

[51] Int. Cl.[4] .................... F16K 33/00; F16K 31/08; F16K 31/18

[52] U.S. Cl. .................... 137/399; 73/313; 73/333; 137/423; 137/429; 137/554; 137/558; 200/84 C; 251/65; 307/118; 335/207; 361/178

[58] Field of Search .................. 73/308, 313, 323, 329, 73/332, 333, 334; 137/386, 399, 423, 429, 554, 558; 200/84 C; 251/65; 361/178; 335/207; 307/118

[56] References Cited

U.S. PATENT DOCUMENTS

| | | | |
|---|---|---|---|
| 376,255 | 1/1888 | Parker et al. | 73/332 |
| 988,104 | 7/1911 | Leonhardt | 73/332 |
| 2,236,360 | 3/1941 | Beam | 200/84 C |
| 2,694,171 | 11/1954 | Campbell | 200/84 C |
| 2,790,459 | 4/1957 | Thomas | 200/84 C |
| 3,163,731 | 12/1964 | Lyden | 200/84 C |
| 3,419,695 | 12/1968 | Dinkelkamp | 200/84 C |
| 3,437,771 | 4/1969 | Nusbaum | 200/84 C |
| 3,992,941 | 11/1976 | McGoldrick | 73/313 |
| 4,142,079 | 2/1979 | Bachman | 73/313 |
| 4,480,469 | 11/1984 | Tice | 73/313 |

Primary Examiner—G. L. Walton
Attorney, Agent, or Firm—Eugene Gierczak

[57] ABSTRACT

A liquid level control device for monitoring the level of water in a steam generating tank between predetermined upper, intermediate, and lower levels, with the tank equipped with a valve for introducing water into the tank and heat energy valve means to generate steam to the water, comprising: a glass gauge tube adapted to be vertically mounted exteriorly of the tank; a top and bottom cover covering the ends of the glass gauge tube, with a bottom cover including an opening for communicating with a liquid in the tank and the top cover including an opening for communicating with steam generated in the tank; upper and lower magnetic float means mounted co-axially within the glass gauge tubes; the upper magnetic float means including means to activate the valve when the water is the region of the predetermined intermediate level so as to introduce water into the tank until the water is in the region of the predetermined upper level, and to deactivate the valve and stop the introduction of water when the water is in the region of the predetermined upper level; the lower magnetic float means is adapted to continuously maintain the application of heat energy during the introduction of water and activates the heat energy valve means to stop the application of heat energy in the steam generating tank when the water is in the region of the predetermined lower level.

8 Claims, 3 Drawing Figures

U.S. Patent  Aug. 12, 1986  4,605,038
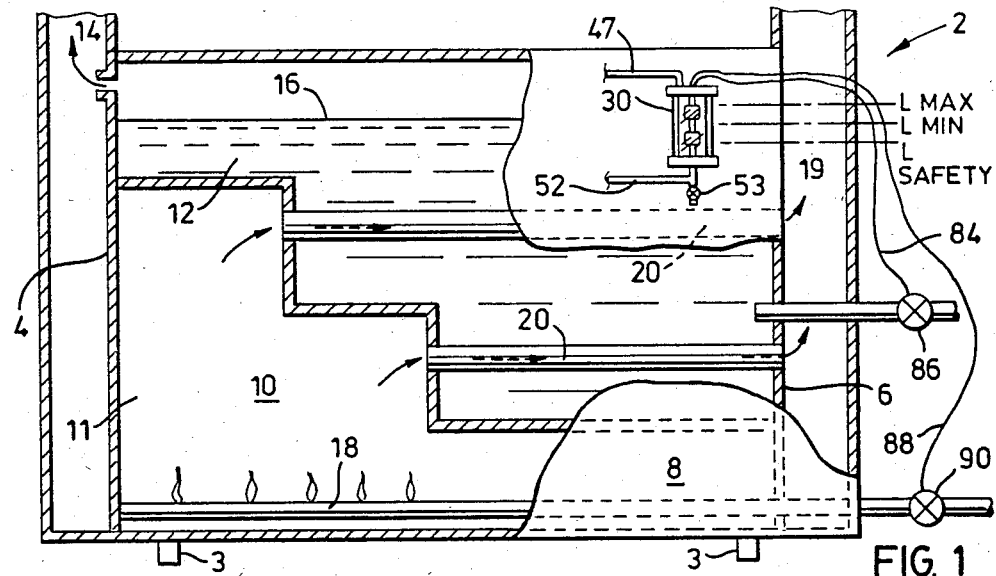
FIG. 1
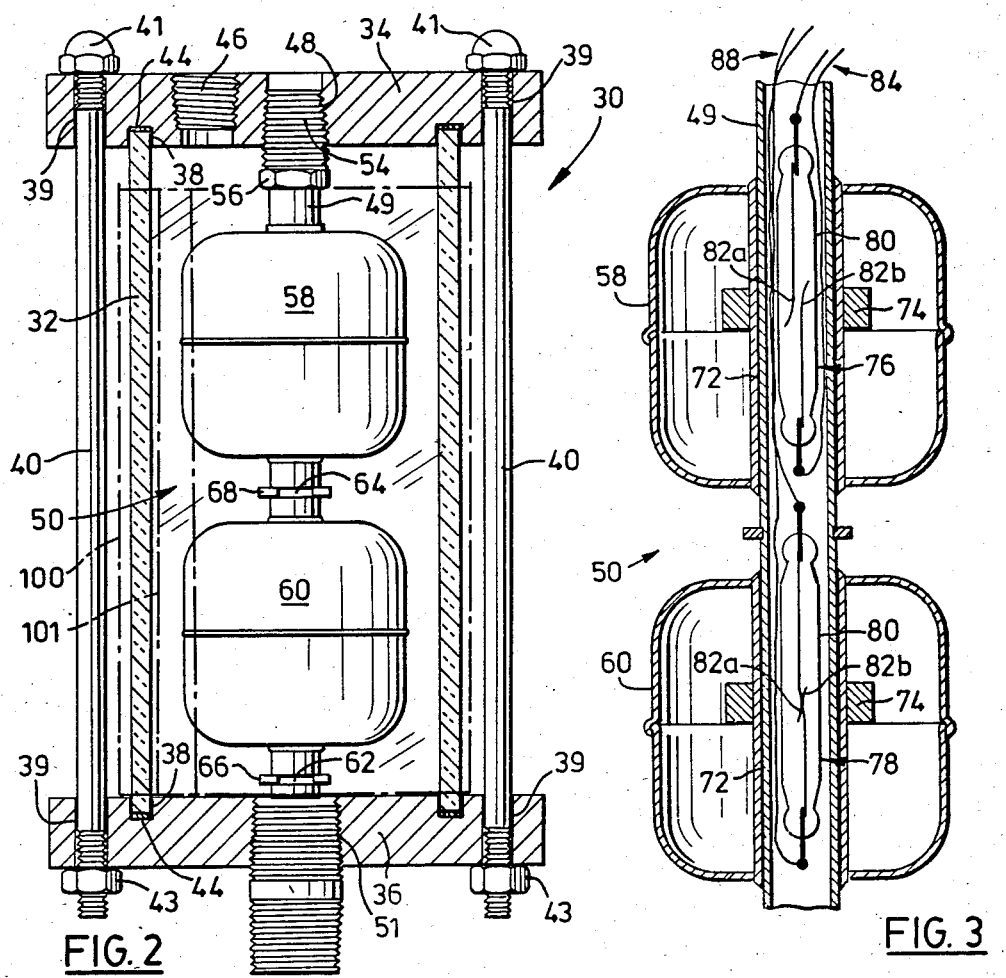
FIG. 2
FIG. 3

FLOAT VALVE CONTROL

FIELD OF INVENTION

This invention relates to a liquid level control device for monitoring the level of liquid in a tank or the like, and more particularly to the combination of a magnetic float system mounted within a glass gauge exteriorally of a steam generating boiler so as to provide a device which is less expensive to construct and more efficient when used, than known alternatives.

BACKGROUND TO THE INVENTION

Liquid level control devices have been employed to control the level of water in a tank or the like, between predetermined levels. Furthermore, glass gauges or water glasses have been utilized for mounting exteriorally of the tank so as to visually observe the level of liquid within the tank.

One example of an earlier liquid level control device of interest is that found in U.S. Pat. No. 1,859,009, wherein a column cylinder of seamless steel houses two open water-filled floats of dissimilar weight which are connected with a whistle in such a manner that raising and lowering of the water level beyond predetermined limits permits the operation of the whistle. The cylinder has threaded and welded connections for attachment to the boiler and connection with a water glass.

Another prior alternative is disclosed in U.S. Pat. No. 4,186,419, which teaches apparatus for monitoring and controlling the liquid level in a storage tank by placing at least two magnetically operated switches at different levels in the tank and causing a magnet containing float to move in response to the liquid level to activate the switches. A relay operates upon activation of the higher of the switches to start electrical current flowing to operate a discharge pump thereby controlling the liquid level in the tank.

U.S. Pat. No. 3,437,771 relates to a float assembly constructed to include two relatively movable float elements, one of which is captive relative to the other, and in which the captive one is provided with magnetic means for operating or affecting magnetic sensing devices or switches.

Furthermore, U.S. Pat. No. 4,480,469 shows a device which is inserted in a tank and which device includes a float guided on a upright magnetically transparent tube which houses the relay switches, and where at least one of the switches is mechanically adjustable by use of a set screw for elevation within the tube.

Moreover, U.S. Pat. No. 3,419,695 teaches the use of a magnet and magnetic material such as a metallic ring, each mounted on a shaft within the tank, wherein the magnetic material attracts and retains the magnet in the event that the liquid carries the magnet into the vacinity of the magnetic material and prevents the magnet and float from falling under small or temporary liquid displacements to falsely operate the switch.

Finally, pivotally actuated float mechanisms have been used to control the level of water in a tank or the like.

Such liquid level control devices often fail to perform after usage due to a build up of mineral scale or deposits such as calcium or the like precipating from the liquid onto the moving parts of the control device, which inhibits the movement of the float mechanism. Such scale deposits may quickly form even after regularly cleaning the control device, depending on the condition of the liquid. Furthermore, one is not aware of the build up of such scale until the liquid level control device fails to perform as such device has been placed within the tank and therefore not visually observable.

OBJECTS OF THE INVENTION

The principal object of this invention is to provide a more efficient operating liquid level control device which is less likely to fail in its proper performance.

More particularly, it is an object of this invention to limit the number of required components to a minimum, and to arrange the components in a manner so as to minimize the utilization of space, all of which promotes greater efficiency and keeps the cost of production down.

FEATURES OF THE INVENTION

This invention relates to a liquid level control device for monitoring the level of water in a steam generating tank between predetermined upper, intermediate, and lower levels, with the tank equipped with a valve for introducing water into the tank and heat energy valve means for introducing heat energy to the water to generate steam from the water, comprising: a glass gauge tube adapted to be vertically mounted exteriorally of the tank; a top and bottom cover covering the ends of the glass gauge tube, with a bottom cover including an opening for communicating with a liquid in the tank and the top cover including an opening for communicating with steam generated in the tank; upper and lower magnetic float means mounted co-axially within the glass gauge tube; the upper magnetic float means including means to activate the water valve when the water (level) is in the region of the predetermined intermediate level so as to introduce water into the tank until the water is in the region of the predetermined upper level, and to deactivate the water valve and stop the introduction of water when the water is in the region of the predetermined upper level; the lower magnetic float means is adapted to continuously maintain the application of heat energy during the introduction of water at the intermediate level, and the lower magnetic float means is adapted to activate the heat energy valve means to stop the application of heat energy in the steam generating tank when the water (level) is in the region of the predetermined lower level.

DESCRIPTION OF THE DRAWINGS

These and other objects and features are illustrated and described in the following specification to be read in conjunction with the sheets of drawings in which:

FIG. 1 is a partial cross sectional view of the steam generating tank utilized in commercial ovens illustrating the use of the liquid level control device.

FIG. 2 is a cross sectional view of the liquid level control device.

FIG. 3 is a cross sectional view of the magnetic float assembly.

DESCRIPTION OF THE INVENTION

Identical parts have been given identical numbers throughout the figures.

FIG. 1 illustrates an industrial oven 2 which rests on legs 3 and has side walls 4 and 6, front wall 8 and back wall 10. The industrial oven also includes steam generating tank or boiler 12 which is used to generate steam 14 from water 16 located in the tank 12.

Gas burner tubes 18 are utilized to generate heat energy in the chamber 11 which is bounded by side walls 4 and 6, front wall 8, and back wall 10 respectively. The heat energy raises the temperature of the tank 12 and the water 16. The heat exhaust 19 escapes through exhaust tubes 20 which run through the tank 12 and assist in heating the water 16 for the generation of steam 14.

Steam 14 is then diverted to the cooking areas of the stove (not shown) in order to cook food products.

It is important for the safe operation of the steam generator tank 12, that the level of water 16 be maintained between predetermined levels of $L_{MAX}$ or upper level and $L_{MIN}$ or intermediate level.

A liquid level control device 30 as illustrated in FIG. 2 is utilized to maintain the level of water in the tank 12 between the predetermined levels $L_{MAX}$ and $L_{MIN}$. The safety lower level or level of $L_{SAFETY}$ is also illustrated in FIG. 2 which represents the minimum level required for the gas burners to operate. The flow of gas to the gas burners 18 is automatically shut off should the level of water fall below $L_{SAFETY}$ in a manner to be described herein.

The liquid level control device 30 comprises of a glass gauge tube 32 which is visually transparent so as to disclose the contents therein. In the preferred embodiment the glass gauge tube may be comprised of Pyrex Borosilicate glass.

The control device also includes a top cover 34 and a bottom cover 36 which are both disc shaped and include an annular groove 38 along one surface for receiving the ends of the glass gauge tube 32.

The covers 34 and 36 contain a series of aligned holes 39 which are adapted to receive fasteners such as bolts 40 for fastening the components of the liquid level control device together. The holes 39 on covers 34 and 36 are located on a bolt circle which is larger in diameter than the outside diameter of the glass gauge tube 32 so that the bolts 40 will be located exteriorally of the glass tube 32.

The bolts 40 illustrated in FIG. 2 have heads 41 to engage the top cover 34 and nuts 43 to engage the bottom cover 36.

Gaskets 44 are utilized to seal the liquid level control device 30. A gasket 44 is located in groove 38 of top cover 34, and in groove 38 of bottom cover 36. The gaskets 44 are located intermediate the covers 34 and 36 and the ends of glass gauge tube 32 respectively.

Top cover 34 also includes an opening on hole 46 which communicates with the vapour side of tank 12 by means of a copper tube 47 as illustrated in FIG. 1.

The cover 34 also includes a threaded hole 48 adapted to receive the float assembly 50 in the manner which shall be described more fully herein.

The bottom cover 36 also presents an opening 51 which is adapted to receive piping section 52 that communicates with the water side of the tank 12. The bottom of the piping section 52 presents a drain cock valve 53 for bleeding the interior of the liquid level control device 30.

The opening 48 and 51 are aligned coaxially with the glass gauge tube 32. The magnetic float assembly 50 will also coaxially align with the top cover 34, glass gauge 32, and bottom cover 36.

The magnetic float assembly 50 comprises of a hollow shaft 49 having a threaded portion 54 at one end thereof, which is threadedly received by the opening 48 of top cover 34 in the manner so as to effect a water tight connection between the shaft 49 and top cover 34. A nut portion 56 is provided in the region adjacent the threaded portion 54 in order to provide a surface for a tool such as a wrench (not shown) to engage when tightening the shaft 49 into opening 48.

Floats 58 and 60 are slidably mounted on the shaft 52. The shaft 49 presents an annualar groove 62 at the end remote from the threaded portion 54 and a second annular groove 64 which is located between the nut 56 and annular groove 62. A "C" shaped washer 66 snaps into the groove 62, and a second "C" shaped washer 68 snaps into the groove 64 so as to be fixedly retained therein.

The "C" shaped washer 66 and 68, and nut 56 are used to limit the movement of the floats 58 and 60 along the shaft 49. Therefore the float 58 is capable of slidably moving along shaft 49 between nut 56 and "C" shaped washer 68, and the float 60 is capable of movement along shaft 49 between "C" shaped washer 68 and "C" shaped washer 66.

The liquid level control device 30 may be assembled in the following fashion. The magnetic float assembly 50 is attached to top cover 34 by threading the threaded portion 54 of shaft 49 into opening 48 of top cover 34. The gasket 44 is then placed into the groove 38 of top cover 34 and one end of the glass gauge 32 is placed into the groove 38 of top cover 34, over the gasket 34. A gasket 44 is then placed into groove 38 of bottom cover 36 and positioned so that the other end of the glass gauged tube is placed into the annular groove 38 of bottom cover 36. Bolts or studs 40 are then placed into the holes 39 of top and bottom plate covers 34 and 36 respectively, and the nuts 43 tightened so as to assemble the liquid level control device 30 in a water tight fashion.

The pipe section 52 is then threaded into opening 51. A drain cock 53 is then attached to the piping section 52 as best seen in FIG. 1.

The liquid level control device 30 is then mounted or attached to tank 12 by means of a copper tube 47 and piping 52. The copper tube 47 connects opening 46 of top cover 34 with the steam side of the boiler 12, and the piping 52 attaches the opening 51 with the water side of the boiler 12.

The water level inside the glass gauge 32 will be the same as the liquid level in the tank 12 because of the connections 47 and 52. Any drop or rise in the liquid level in tank 12 will produce a corresponding drop or rise of liquid level control device 30.

Furthermore, the liquid level in the tank 12 may be visually observed by viewing the level of water through the transparent glass gauge tube 32.

The liquid level control device 30 is mounted vertically and exteriorally of the tank in the manner so that the maximum and the minimum extent of travel of the float 58 along shaft 49 will correspond to the maximum level $L_{MAX}$ and the minimum level $L_{MIN}$ respectively of the water level in tank 12.

Furthermore the lower float 60 is adapted to shut off the gas supply to gas burner 18 in the event that the water level falls below the safety level of water $L_{SAFETY}$ in the manner to be described herein.

The construction and operation of the magnetic float assembly 50 may be best understood by reference to FIG. 3.

The floats 58 and 60, and shaft 49 are comprised of non-magnetic materials. Floats 58 and 60 are hollow and generally toriodal in shape, having an interior cylindrical surface 72 so as to enable the floats 58 and 60 to slidably travel vertically upwardly or downwardly along the shaft 49 in response to a change of liquid level in the glass gauge tube 32. A magnet 74 is located inside each of the floats 58 and 60.

The shaft 49 is hollow and has a reed switch assembly 76 located therein in the region of float 58, and a second reed switch assembly 78 located inside the shaft 52 in the region of float 60. Each of the reed switch assemblies are comprised of glass bulb 80 and two electrical contact points 82a and 82b, which are comprised of magnetic materials such as steel. Electrical wires 84 connect reed switch assembly 76 to an electrically operated solenoid valve or valve for introducing water 86. Electrical wires 88 connect the reed switch assembly 78 with the gas shut off valve 90.

Reed switch assembly 76 has electrical contact points 82a and 82b biased in an open position, i.e. the contact points 82a and 82b are normally spaced apart when not influenced by the magnetic field generated by magnet 74. Once the magnet 74 is moved into a position adjacent the contact points 82a and 82b of reed switch 76, the magnetic field generated by magnet 74 causes the points 82a and 82b to contact each other, thereby closing the electrical current in wires 84, and causing the solenoid valve 86 to close and shut off the supply of water 16 into tank 12.

The solenoid valve is connected to a water line as seen in FIG. 1 which water is at tap pressure of approximately 70 pounds pressure. The steam 14 and water 16 in tank 12 is operating at a pressure of approximately 14 pounds pressure. Accordingly, when the solenoid valve 86 is opened, water is introduced into tank 12. When the solenoid valve 86 is closed, the supply of water 16 into tank 12 is shut off. This invention should not be limited to the above described apparatus for introducing water 16 into the tank 12 as a pump could also be used.

Reed switch assembly 78 has electrical contact points 82a and 82b biased in a closed position, i.e. the contact points 82a and 82b are normally in contact with one another when not influenced by the magnetic field generated by magnet 74. Once the magnet 74 is moved into a position adjacent the contact points 82a and 82b, the magnetic field generated by magnet 74 causes the contacts 82a and 82b to separate from each other, thereby breaking the electrical current to the gas valve or heat energy valve 90 and shutting off the supply of gas to the burners 18.

The operation of the liquid level control device may be described as follows. Let us assume that the liquid 16 is at its maximum level $L_{MAX}$ in both the tank 12 and the liquid level control device 30. The float assembly 58 floats in the water such that the magnetic 74 will be in a region adjacent the electrical contact points 82a and 82b of reed switch 76: and the magnetic field will cause the contacts 82a and 82b to contact each other thereby completing the electrical circuit into the solenoid valve 86 and shutting off the water supply to the generator 12. The float 60 will also float in the water but will be retained by "C" clamp 68. In this position magnet 74 of float 60 is located a distance from contact points 82a and 82b of reed switch assembly 78 and therefore the contacts 82a and 82b are in their biased closed position and the gas is supplied to the gas burners 18.

As the water 16 is heated to produce steam 14, the level of water 16 drops in the tank 12; and the float 58 will also correspondingly drop in response to the change of liquid level in the liquid level control device 30.

When the liquid 16 reaches the position designated by $L_{MIN}$ the magnet 74 will be sufficiently distant from contact points 82a and 82b so that the contacts 82a and 82b will separate from one another in their biased open position, which breaks the electrical circuit to the solenoid valve 86, causing water to be introduced into the tank 12. When the water level again reaches $L_{MAX}$ the float rises in response to the change in liquid in the liquid level control device 30, and the magnet 74 in float 58 causes the contacts 82a and 82b to close and thereby close the solenoid valve 86.

Float 60 is utilized as a safety feature. So long as the water level is at least the safety level $L_{SAFETY}$, the magnet 74 in float 60 is sufficiently distant from contacts 82a and 82b of reed switch 78 such that the contact points 82a and 82b will be in their closed position. Once the level of liquid falls below the safety level $L_{SAFETY}$ the float 60 containing magnet 74 will also fall in response to the change in the liquid level. In this position the magnet 74 of float 60 will be adjacent the contact points 82a and 82b of reed switch 78 and thereby cause the points to separate, breaking the circuits to the gas valve 90 and shutting off the supply of gas to the burners 18.

A cylindrical metallic sleeve 100 which is cut along its length thereof to provide a viewing opening 101 is placed around the glass gauge 32 in order to protect the glass. The metallic sleeve is rotatable for easy viewing of the liquid in the glass gauge tube.

Although the preferred embodiment as well as the operation in use have been specifically described in relation to the drawings, it should be understood that variations in the preferred embodiment could easily be achieved by a man skilled in the art without departing from the spirit of the invention. For example, the reed switch 76 has been described as being biased in an open position while reed switch 78 has been described as being biased in a closed position; although this bias may be reversed. Accordingly, the invention should not be understood to be limited to the exact form revealed in the drawings.

The embodiments of the invention in which an exclusive property or privilege is claimed or defined as follows:

1. In a liquid level control device for monitoring the level of water in a steam generating tank between predetermined upper, intermediate and lower levels, said tank equipped with a valve for introducing water into said tank and valve means for introducing heat energy to the water to generate steam, comprising:
   (a) a glass gauge tube adapted to be vertically mounted exteriorally of said tank;
   (b) a top and bottom cover covering the ends of said glass gauge tube, said bottom cover including an opening for communicating with said liquid in said tank and said top cover including an opening for communicating with the steam generated in said tank;
   (c) upper and lower magnetic float means mounted co-axially within said glass gauge tube;
   (d) said upper magnetic float means including means to activate said water valve when said water is in the region of said predetermined intermediate level so as to introduce water into the tank until said water is in the region of said predetermined upper level, and to deactivate said water valve and stop the introduction of water into the tank when said water is in the region of said predetermined upper level;

(e) said lower magnetic float means is adapted to continuously maintain the application of heat energy during said introduction of water at said intermediate level, and said lower magnetic float means is adapted to activate said heat energy valve means to stop the application of heat energy in said steam generating tank when said water is in the region of said predetermined lower level.

2. A liquid level control device as claimed in claim 1 wherein said upper magnetic float means is adapted for movement co-axially within said glass gauge tube between said predetermined upper and intermediate level, and said lower magnetic float means is adapted for movement co-axially within said glass gauge tube between said predetermined intermediate and lower level.

3. A liquid level control device as claimed in claim 2 wherein a protective sleeve is rotatably mounted about said glass gauge tube, said protective sleeve including a slot therealong for visual observation of said level of water within said glass gauge tube.

4. A liquid level control device as claimed in claim 3 wherein said top and bottom covers include an annular groove to receive the respective ends of said glass gauge tube.

5. A liquid level control device as claimed in claim 4 including gasket means adapted to be received by said annular grooves of said top and bottom covers respectively to effect a watertight seal between said top and bottom covers and the ends said glass gauge tube respectively.

6. A liquid level control device as claimed in claim 5 including releasable fastening means to releasably fasten said top and bottom covers respectively to said glass gauge tube.

7. A liquid level control device as claimed in claim 6 wherein said top cover includes holes and said bottom cover includes holes which align with the holes of said top cover for receiving bolt means therein, and which bolt means are presented exteriorially of said glass gauge tube and said protective sleeve to releasably fasten said glass gauge tube intermediate said top and bottom covers.

8. A liquid level control device as claimed in claim 7 including a shaft mounted coaxially within said glass gauge tube and said upper magnetic float means is adapted for coaxial movement along said shaft between said predetermined upper and intermediate level, and said lower magnetic float means is adapted for coaxial movement along such shaft between said intermediate and lower level.

* * * * *